Dec. 3, 1935. H. S. JANDUS 2,022,668
BUMPER CONSTRUCTION
Filed July 1, 1933 2 Sheets-Sheet 1
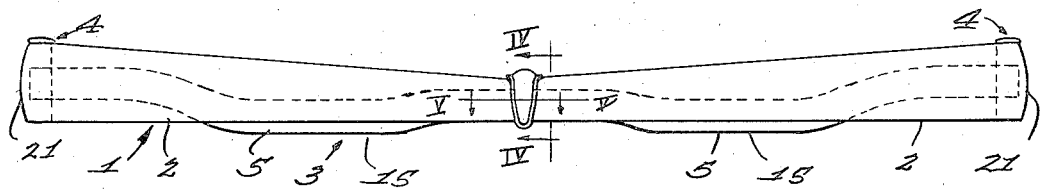
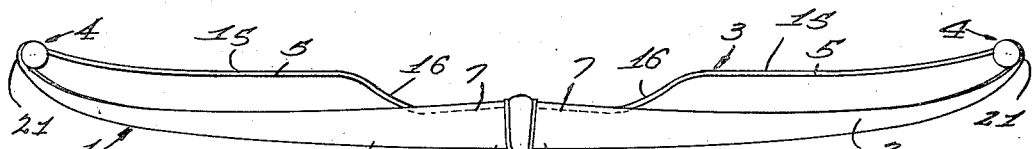
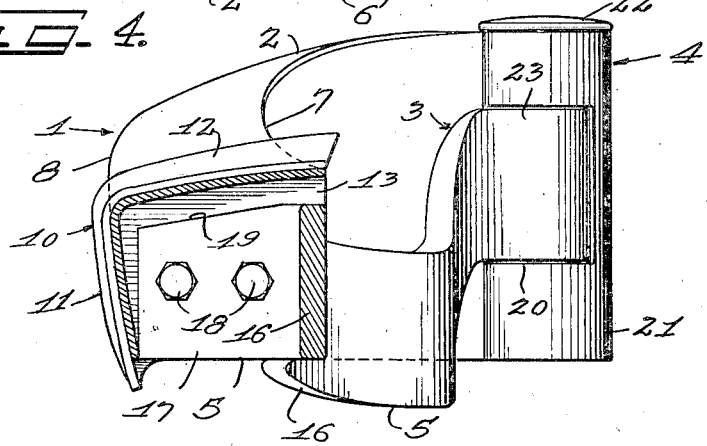
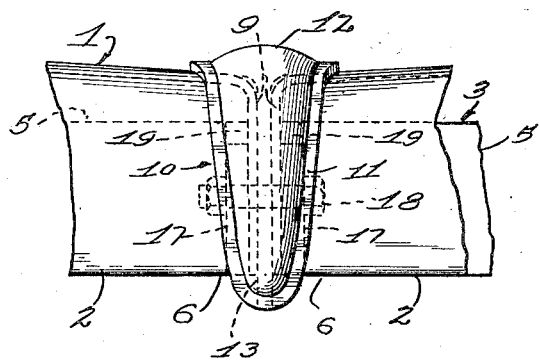
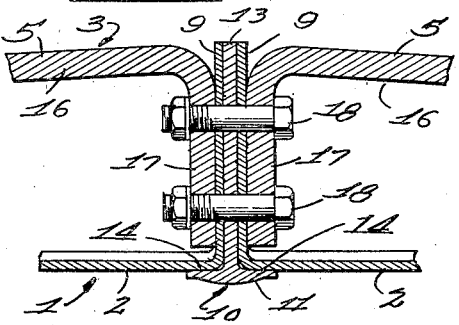
Inventor
HERBERT S. JANDUS.

Dec. 3, 1935. H. S. JANDUS 2,022,668
BUMPER CONSTRUCTION
Filed July 1, 1933 2 Sheets-Sheet 2
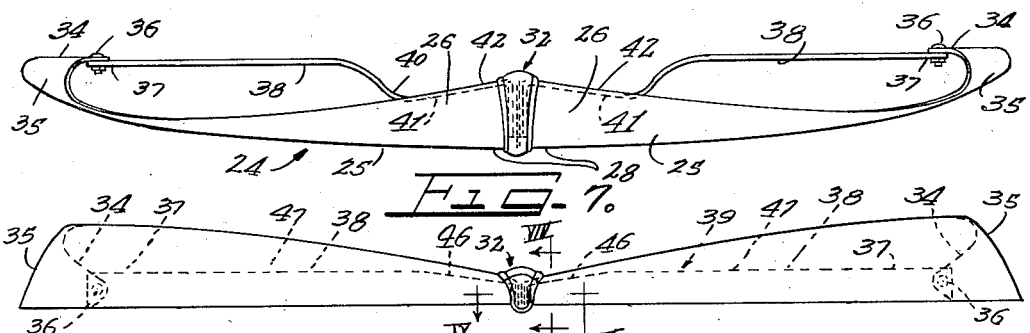
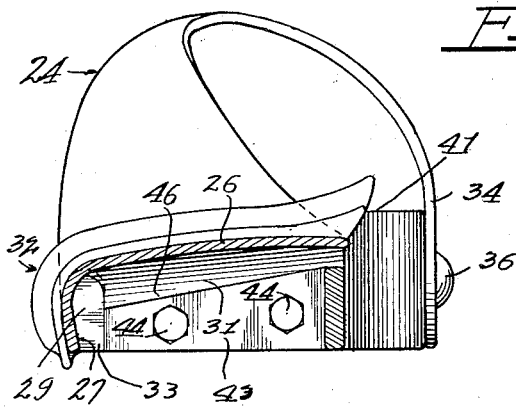
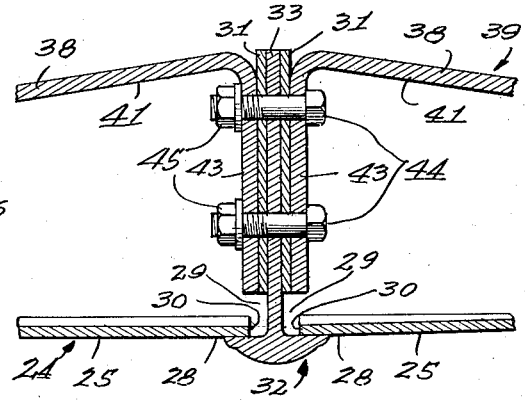
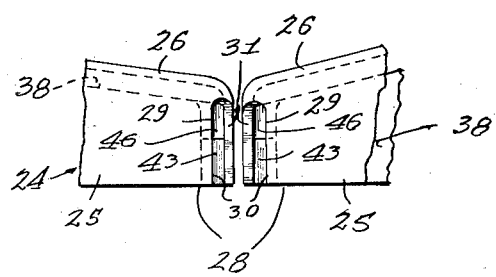
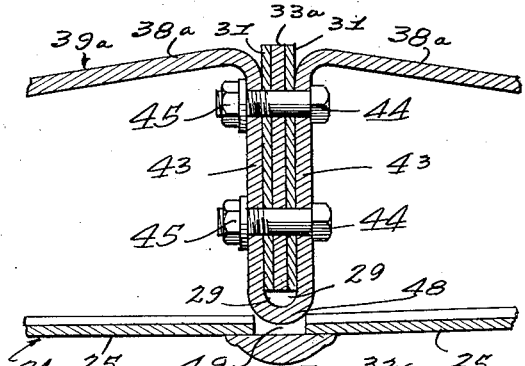
Inventor
HERBERT S. JANDUS.

Patented Dec. 3, 1935

2,022,668

UNITED STATES PATENT OFFICE 2,022,668

BUMPER CONSTRUCTION

Herbert S. Jandus, Detroit, Mich., assignor to General Spring Bumper Corporation, Detroit, Mich., a corporation of Michigan Application July 1, 1933, Serial No. 678,585

17 Claims. (Cl. 293—55)

This invention has to do with bumpers and is concerned more particularly with a bumper in which the impact bar is built up.

The modern trend in automobile body design has stream lining as its motif, and as a result, right-angles are giving way to convex curves and obtuse angles, and, for the purpose of harmonizing with the body design, accessories are correspondingly designed. The special and often times unusual shapes of bumpers which are thus required are such as to very materially increase the cost of manufacture if the impact bar is made in one piece.

It is accordingly one of the principal objects of this invention to provide a bumper including an impact bar of non-uniform cross-section throughout its length in such a manner as to materially reduce its cost of construction without sacrificing its efficiency in use.

It is another object of the invention to provide a bumper including a built up impact bar and including ornamental means affording a rigid connection between the impact bar sections.

It is a further object of the invention to provide a bumper embodying a built up impact bar and including means for reinforcing the impact bar at its center.

Another object of the invention involves the provision of a built up impact bar and a built up back bar for a bumper, combined with reinforcing means arranged transversely to and between said bars to brace the same apart and at the same time properly reinforce the central portions of the bars.

In accordance with the general features of the invention the impact bar comprises a pair of sections narrower in elevation at its center than at its ends, and wider in plan at its center than at its ends, the inner ends of the sections of the bar having slightly spaced substantially vertical transverse faces providing substantially solid angles. A medallion having a preferably ornamental face is formed with a web positioned between said faces and formed to conceal the juncture of the ends from the front as well as from the top. In accordance with one form of the invention, the back bar is formed in a pair of sections whose inner ends are turned forwardly to straddle the vertical end portions of the impact bar sections, whereupon all said vertical parts are bolted or riveted rigidly together. In accordance with another form of the invention, vertical slots are provided in the forward part of the web of the medallion and in the adjacent portions of the section ends of the impact bar, and the back bar is made in one piece which passes through said slots, the construction being otherwise the same as above described. The inner ends of the impact sections are preferably formed by bulldozing operations, and should a large amount of metal be involved in such operations, then if desired, corner slots may be formed in the impact sections to facilitate the formation of such ends.

Further objects and advantages of the invention will appear as the description proceeds.

This invention (in preferred forms) is illustrated in the drawings and hereinafter more fully described.

On the drawings:

Figure 1 is an elevational view of a bumper embodying one form of the invention.

Figure 2 is a plan view of the structure shown in Fig. 1.

Figure 3 is an enlarged fragmentary elevational view of the central portion of the structure appearing in Figure 1.

Figure 4 is an enlarged sectional view taken substantially in the plane designated by the line IV—IV of Figure 1.

Figure 5 is an enlarged fragmentary sectional view taken substantially in the plane designated by the line V—V of Figure 1.

Figure 6 is a plan view of another form of the invention.

Figure 7 is an elevational view of the structure shown in Figure 6.

Figure 8 is an enlarged sectional view taken substantially in the plane designated by the line VIII—VIII of Fig. 7.

Figure 9 is an enlarged fragmentary sectional view taken substantially in the plane designated by the line IX—IX of Figure 7.

Figure 10 is an enlarged fragmentary elevational view showing the inner ends of the bar sections of the form of the invention shown in Figure 6.

Figure 11 is an enlarged fragmentary sectional view similar to Figure 9 but showing a further modified form of the invention.

Referring now more particularly to the drawings, the form of the invention appearing in Figures 1 to 5, inclusive, comprises an impact member 1 having sections 2. While the drawings illustrate that the impact member is formed of two half sections, it will be understood that a greater number of sections may be employed and the embodiment here shown is for illustrative purposes only. The sections 2 are formed at their outer ends with means providing, with the supporting member 3, hinge connections 4. Any suitable connections may be provided for the ends of the impact and supporting members, the hinge connections 4 being included herein for illustrative purposes only. The supporting member 3 in accordance with the form of the invention appearing in Figures 1 to 5, inclusive, consists of two sections 5, although it is to be understood that this number is included herein for illustrative purposes since the number of sections of the supporting member may also be varied without departing from the principles of the present invention.

The impact member 1 is preferably of generally concavo-convex cross-section with its convex surface foremost, and for illustrative purposes is shown as being substantially wider in elevation at its ends than at its center to harmonize with current radiator and radiator grille designs, which project centrally forwardly and which, in many cases, project centrally downwardly at their bottoms. This shape in elevation of the impact bar or member may be effected in various ways, but in accordance with the present invention, is formed by bending the upper portion of each section 2 from a point adjacent the outer end of the section of gradually increasing width to the inner end 6 as shown at 7 in Figures 2 and 4. The bend thus caused is preferably rounded as shown at 8 for stream-lining purposes as well as for improved design and for reducing the cost of manufacture. The inner end 6 of each section as thus formed is then subjected to a bulldozing operation whereby the material at said end is bent at right angles to the generally vertically as well as generally horizontally extending portions at said end to form a solid angle such as a box corner, the side of the corner thus formed being designated by the reference character 9. The trihedral angle thus formed comprises the generally vertical front portion, the horizontally extending portion 7, and the generally vertically and transversely extending portion 9, of each section.

For the purpose of concealing the juncture of the inner ends 6 of the sections 2, a medallion 10 is provided in the form of a substantially L-shaped member having a front portion 11 and top rearwardly extending portion 12. The medallion 10 may be of any desired ornamental shape and is preferably tapered forwardly and downwardly to harmonize with the shape of the impact bar as a whole. It will be observed from Figure 3 that the medallion 10 serves to adequately conceal the juncture of the sections 2 both from the front and the top. The medallion 10 is formed with a substantially centrally located web 13 so that, in cross-section, the medallion is substantially T-shaped with the portions 11 and 12 forming the head of the T. The web 13 is of substantially the same dimensions as the vertical wall portions 9 of the section ends 6, and is positioned therebetween and determines the extent to which the sections 2 are permitted to approach each other as clearly seen in Figures 3 and 5. For purposes of strength as well as design, the portions 11 and 12 of the medallion 10 are outwardly convex. The inner surfaces 14 of the portions 11 and 12 have the same configuration as the adjacent end portions of the sections 2 so that said surfaces lie flush against the forward and upper surfaces of said end portions.

The supporting or back bar sections 5 are spaced rearwardly from the forward portions of the sections 2 and are provided with attaching portions 15 whereby the same may be secured to the spaced portions of the chassis frame (not shown). The inner ends of the supporting sections 5 are projected forwardly at 16 to form a forwardly bowed portion to reinforce the central part of the impact member 1, and the extremities 17 of the portions 16 are bent at substantially righ-angles to said portions and forwardly in straddling relation to the inner end walls 9 of the impact sections 2, as clearly seen in Figures 4 and 5.

Bolts 18, rivets or the like are then passed through registering holes in the portions 9, 13 and 17 as shown in Fig. 5, thereby forming a rigid connection between the impact and back bar sections and the medallion 10, whereby such parts operatively constitute a substantially integral unit. In order that the parts may fit together properly, the portions 17 may be cut away at 19 at their upper margins. In assembling the parts prior to application of the securing means 18 the hinge connections are preferably first formed by inserting the outer ends of the supporting sections 5 through the slots 20 in the eyes 21 at the ends of the impact member and fastening the pivot bolts 22 in position so that the support section eyes 23 are held in proper pivotal relationship to the eyes 21.

The material forming the various parts of the bumper construction may be of any suitable character and is preferably of spring bar steel insofar as the impact and supporting structure are concerned. The medallion 10 may be formed by casting or stamping operations and is preferably of metal, such as steel.

In the form of the invention shown in Figures 6 to 10, inclusive, the impact member 24 comprising half sections 25 is formed in a manner similar to the manner in which the impact member 1 is formed and the steps need not be repeated here. In this form of the invention, the horizontally extending portion 26 of each section 25 is of substantially greater width as shown in Figure 8, than the forward portion 27, and for the purpose of facilitating the bulldozing operation, the inner end portions 28 of the sections 25 are formed with vertical slots 29. Thus, in effect, prior to the bulldozing operation, the inner end portion of each impact section includes a horizontal portion 26 which extends longitudinally beyond the extremity 30 of the forward portion of the section to provide an extension 31 which, during the bulldozing or bending operation, is turned to a substantially vertical position as seen to advantage particularly in Figures 8 and 10. When thus bent into vertical positions, the walls 31 constitute the inner extremities of the sections 25.

A medallion of a construction similar to the medallion 10 but so dimensioned as to conform to the portions 26 and 27 of the sections 25 is shown at 32 with its web 33 positioned between and in engagement with the inner end walls 31 of the sections 25.

The outer end portions 34 of the sections 25 are return bent obliquely as shown at 35 to provide attaching flaps which are bolted at 36, riveted or otherwise suitably secured to the outer ends 37 of the half sections 38 of the supporting or back bar structure or member 39. The back bar structure 39 is centrally bowed forwardly at 40 and then is reversely bowed at 41 to follow the free edge 42 of the rearwardly extending portion 26 at the center of the impact member 24. There is thus provided a portion which will serve to reinforce the center of the impact member to guard against excessive deflection thereof, together with a portion which will yield somewhat so that the central portion of the impact member may be flexed to some extent and thereby prevent breakage upon impact. This is likewise true of the bowed portions 16 of the supporting bar sections 5 in the previously described form of the invention. The inner extremities of the supporting sections 38 are thereupon bent forwardly as shown at 43 to provide substantially vertical walls which, in the assembly of the bumper structure, are placed in straddling relation to the inner end walls 31 of the impact sections 25 as clearly seen in Figure 9. With the parts so assembled, securing means, such as bolts 44, are passed through registering holes in the respective parts, and nuts 45 and lock washers applied to the free ends of the bolts as shown. Of course, it is to be understood that any other suitable securing means, such as rivets and the like, may be employed instead of the bolts shown. When the nuts 45 are tightened, the central parts of the bumper are rigidly secured and operatively constitute an integral structure. In the assembly of the parts, if desired, the central parts of the bumper may be first connected and the ends connected thereafter or this procedure may be reversed. To the end that the parts may be secured together without interference one with the other, the inner portions of the back sections 38 are made of reduced height as shown at 46 in Figures 7 and 8. The supporting sections 38 are formed with portions 47 to be secured to the spaced chassis frame members of an automobile (not shown).

The form of the invention shown in Figure 11 is substantially identical with that shown in Figures 6 to 10, inclusive, with the exception that the back bar structure 39a is formed of an integral bar whose halves 38a are joined at their forward extremities by the nose 48. The forward portion of the web 33a of the medallion 32a is notched at 49 in substantial register with the notches 29 in the impact sections 25 to enable the nose 48 to pass therethrough.

The material employed in the parts of the constructions illustrated in Figures 6 to 11, inclusive, may be substantially the same as that employed in the construction shown in Figures 1 to 5, inclusive.

I am aware that many changes may be made and numerous details of construction may be varied through a wide range without departing from the principles of this invention, and I therefore do not purpose limiting the patent granted hereon, otherwise than is necessitated by the prior art.

I claim as my invention:

1. Built-up bumper construction comprising impact sections having adjacent ends, each of said ends being in the form of a tri-hedral angle having front, top and end walls, the end walls of said angles being arranged side by side, a supporting structure comprising a pair of sections having transverse walls straddling said end walls and disposed within said angles, and means including elements passing through the respective walls for securing said sections rigidly together, the walls of the supporting sections being thus shielded from the front and top by the impact sections.

2. Built-up bumper construction comprising impact sections having adjacent ends, each of said ends being in the form of a tri-hedral angle, one wall of each of said angles extending transversely of the sections and said walls being arranged side by side, a supporting structure comprising a pair of sections having transverse walls straddling the first-mentioned walls and disposed within said angles, means including elements passing through the respective walls for securing said sections rigidly together, the walls of the supporting sections being thus substantially concealed by the impact sections, said fastening means including a medallion of substantially T-shape in cross-section, the web of said medallion being disposed between said walls of the impact sections to reinforce the same and the head of the medallion engaging the other two sides of said angles and overlying the juncture of said impact sections to conceal said juncture.

3. Bumper structure comprising a pair of impact sections having adjacent walls extending rearwardly therefrom, a supporting member behind said sections and having a forwardly projecting U-shaped portion straddling said walls, said walls being provided with notches through which the bight of the U-shaped portion passes, a web positioned between said walls, and fastening elements passing through said web, said walls and U-shaped portion and rigidly securing said sections and supporting member together.

4. Bumper construction comprising a built-up impact member including impact sections having adjacent rearwardly extending walls, a supporting member including a pair of sections having forwardly projecting walls engaging the first-mentioned walls, and means securely fastening all of said walls together to reinforce the adjacent portions of said sections, said impact sections being spaced forwardly from the forward extremities of the rearwardly extending walls so that said impact sections may yield rearwardly relative to said walls.

5. Bumper construction comprising an impact member formed of resilient bar stock of substantially uniform width and bent rearwardly intermediate its ends along lines inclined to the horizontal to provide a front area of decreasing dimensions toward the center of the member and a rearwardly extending flange of increasing dimensions toward the center of the member, whereby to provide increased resistance to horizontal yield of the member at the center thereof, said flange being provided with downwardly projecting connecting means, a supporting member for the impact member, said supporting member being formed with connecting means in engagement with the first-mentioned connecting means, and instrumentalities passing through the respective connecting means for rigidly securing the same together.

6. Bumper construction comprising an impact member formed of resilient bar stock of substantially uniform width and bent rearwardly intermediate its ends along lines inclined to the horizontal to provide a front area of decreasing dimensions toward the center of the member and a rearwardly extending flange of increasing dimensions toward the center of the member, whereby to provide increased resistance to horizontal yield of the member at the center thereof, said flange being provided with downwardly projecting connecting means, a supporting member for the impact member, said supporting member being formed with connecting means in engagement with the first-mentioned connecting means, and instrumentalities passing through the respective connecting means for rigidly securing the same together, said impact member comprising a pair of substantially equal sections, said connecting means of said flange comprising depending arms arranged side by side, and the connecting means of the supporting member including arms straddling the first-mentioned arms.

7. Bumper construction comprising an impact member formed of resilient bar stock of substantially uniform width and bent rearwardly intermediate its ends along lines inclined to the horizontal to provide a front area of decreasing dimensions toward the center of the member and a rearwardly extending flange of increasing dimensions towards the center of the member, whereby to provide increased resistance to horizontal yield of the member at the center thereof, said flange being provided with downwardly projecting connecting means, a supporting member for the impact member, said supporting member being formed with connecting means in engagement with the first-mentioned connecting means, and instrumentalities passing through the respective connecting means for rigidly securing the same together, all of said connecting means being rearwardly spaced from the front portion of the impact member, whereby said front portion may yield toward said connecting means.

8. Bumper construction comprising an impact member formed of resilient bar stock and bent rearwardly intermediate its ends along lines inclined to the horizontal to provide a front area of decreasing dimensions toward the center of the member and a rearwardly extending flange of increasing dimensions toward the center of the member, whereby to provide increased resistance to horizontal yield of the member at the center thereof, said flange being provided with downwardly projecting connecting means, a supporting member for the impact member, said supporting member being formed with connecting means in engagement with the first-mentioned connecting means, and instrumentalities passing through the respective connecting means for rigidly securing the same together.

9. Bumper structure comprising a pair of impact sections having adjacent walls extending rearwardly therefrom, a supporting member behind said sections and having a forwardly projecting U-shaped portion straddling said walls, said walls being provided with notches through which the bight of said portion passes, and fastening means associated with said walls and portion and rigidly securing said sections and supporting member together.

10. Bumper construction comprising a resilient impact member having a rearwardly extending wall, a supporting member having a forwardly projecting wall engaging the first-mentioned wall, and means securely fastening said walls together to reinforce the adjacent portions of said members, said impact member being spaced forwardly from the forward extremities of said walls so that said impact member may yield rearwardly relative to said walls.

11. Bumper construction comprising an impact member formed of resilient bar stock bent rearwardly intermediate its ends along a line inclined to a longitudinal edge of the member so as to provide a rearwardly extending flange of increasing dimensions toward the center of the member, whereby to afford increased resistance to horizontal yield of the member at the central portion thereof, said flange being provided with downwardly projecting connecting means, a supporting member for the impact member, said supporting member being formed with connecting means adjacent the aforesaid connecting means, and means rigidly securing the respective connecting means together.

12. Bumper construction comprising an impact member formed of resilient bar stock of substantially uniform width and bent rearwardly intermediate its ends along a line inclined to a longitudinal edge of the member so as to provide a front area of decreasing dimensions toward the central portion of the member and a rearwardly extending flange of increasing dimensions toward the central portion of the member, whereby to afford increased resistance to horizontal yield of said portion, a supporting member for the impact member, said members being provided with adjacent connecting means, and means rigidly securing the connecting means of said members together.

13. Bumper construction comprising an impact member formed of resilient bar stock bent rearwardly intermediate its ends along a line inclined to a longitudinal edge of the member so as to provide a rearwardly extending flange of increasing dimensions toward the center of the member, whereby to afford increased resistance to horizontal yield of the member at the central portion thereof, said flange being provided with downwardly projecting connecting means, a supporting member for the impact member, said supporting member being formed with connecting means adjacent the aforesaid connecting means, and means rigidly securing the respective connecting means together, said connecting means of said flange comprising depending arms arranged side by side.

14. Bumper construction comprising an impact member formed of resilient bar stock of substantially uniform width and bent rearwardly intermediate its ends along a line inclined to a longitudinal edge of the member so as to provide a front area of decreasing dimensions toward the central portion of the member and a rearwardly extending flange of increasing dimensions toward the central portion of the member, whereby to afford increased resistance to horizontal yield of said portion, a supporting member for the impact bar, said members being provided with adjacent connecting means, and means rigidly securing the connecting means of said members together, said connecting means of said impact member comprising depending arms arranged side by side.

15. Bumper construction comprising an impact member formed of resilient bar stock bent rearwardly intermediate its ends along a line inclined to a longitudinal edge of the member so as to provide a rearwardly extending flange of increasing dimensions toward the center of the member, whereby to afford increased resistance to horizontal yield of the member at the central portion thereof, said flange being provided with downwardly projecting connecting means, a supporting member for the impact member, said supporting member being formed with connecting means adjacent the aforesaid connecting means, and means rigidly securing the respective connecting means together, all of said connecting means being rearwardly spaced from said portion, whereby said portion may yield toward said connecting means.

16. Bumper construction comprising an impact member formed of resilient bar stock of substantially uniform width and bent rearwardly intermediate its ends along a line inclined to a longitudinal edge of the member so as to provide a front area of decreasing dimensions toward the central portion of the member and a rearwardly extending flange of increasing dimensions toward the central portion of the member, whereby to afford increased resistance to horizontal yield of said portion, a supporting member for the impact bar, said members being provided with adjacent connecting means, and means rigidly securing the connecting means of said members together, all of said connecting means being rearwardly spaced from said portion, whereby said portion may yield toward said connecting means.

17. Bumper construction comprising an impact member formed of resilient bar stock and bent rearwardly intermediate its ends along a line inclined to a longitudinal edge thereof to provide a rearwardly extending flange of increasing dimensions toward the center of the member, whereby to provide increased resistance to horizontal yield of the member at the central portion thereof, said member being provided with connecting means disposed rearwardly of said central portion, a supporting member for the impact member, said supporting member being provided with connecting means adjacent the aforesaid connecting means, and means rigidly securing the respective connecting means together.

HERBERT S. JANDUS.